United States Patent
Chen (10) Patent No.: US 8,503,819 B2
(45) Date of Patent: Aug. 6, 2013

(54) METHOD AND CIRCUIT FOR CORRECTING DEFECT PIXELS IN IMAGE SIGNAL

(75) Inventor: Hsin-Yu Chen, Tainan County (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 1612 days.

(21) Appl. No.: 12/007,224

(22) Filed: Jan. 8, 2008

(65) Prior Publication Data

US 2009/0129663 A1 May 21, 2009

(30) Foreign Application Priority Data

Nov. 20, 2007 (TW) ................................ 96143809 A (51) Int. Cl.
*G06K 9/40* (2006.01)

(52) U.S. Cl.
USPC ............ 382/275; 382/170; 382/274; 348/246

(58) Field of Classification Search
USPC .. 382/149, 168, 275, 170, 205, 274; 348/246, 348/616
See application file for complete search history.

(56) References Cited

U.S. PATENT DOCUMENTS

| | | | | |
|---|---|---|---|---|
| 5,327,246 A * | 7/1994 | Suzuki | | 348/246 |
| 5,974,166 A * | 10/1999 | Ino et al. | | 382/132 |
| 6,201,891 B1 * | 3/2001 | Ino et al. | | 382/132 |
| 6,381,374 B1 * | 4/2002 | Pourjavid | | 382/275 |
| 6,463,169 B1 * | 10/2002 | Ino et al. | | 382/132 |
| 6,529,622 B1 * | 3/2003 | Pourjavid | | 382/149 |
| 6,587,801 B2 * | 7/2003 | Funakoshi | | 702/84 |
| 6,625,318 B1 * | 9/2003 | Tan et al. | | 382/224 |
| 6,683,643 B1 * | 1/2004 | Takayama et al. | | 348/247 |
| 6,768,513 B1 * | 7/2004 | Watanabe et al. | | 348/246 |
| 7,009,644 B1 * | 3/2006 | Sanchez et al. | | 348/247 |
| 7,106,371 B1 * | 9/2006 | Kubo et al. | | 348/246 |
| 7,248,732 B2 * | 7/2007 | Kuwabara | | 382/149 |
| 7,535,501 B1 * | 5/2009 | Loushin et al. | | 348/246 |
| 7,593,569 B2 * | 9/2009 | Sakurai | | 382/167 |
| 7,974,458 B2 * | 7/2011 | Huang | | 382/149 |
| 8,009,209 B2 * | 8/2011 | Chapman et al. | | 348/246 |
| 8,130,291 B2 * | 3/2012 | Kimura | | 348/246 |
| 8,379,102 B2 * | 2/2013 | Doida | | 348/222.1 |
| 2002/0039139 A1 * | 4/2002 | Hsu et al. | | 348/222 |
| 2003/0030729 A1 * | 2/2003 | Prentice et al. | | 348/220.1 |
| 2003/0039402 A1 * | 2/2003 | Robins et al. | | 382/275 |
| 2003/0179391 A1 * | 9/2003 | Weldy | | 358/1.9 |
| 2004/0027618 A1 * | 2/2004 | Nakamura et al. | | 358/3.26 |
| 2005/0162531 A1 * | 7/2005 | Hsu et al. | | 348/222.1 |
| 2006/0078191 A1 * | 4/2006 | Matsumura | | 382/149 |
| 2006/0100872 A1 * | 5/2006 | Yokoi | | 704/256 |

(Continued)

*Primary Examiner* — Aaron W Carter
(74) *Attorney, Agent, or Firm* — McClure, Qualey & Rodack, LLP (57) ABSTRACT

The invention discloses a method and circuit for correcting defect pixels in an image signal. First, the invention generates a luminance histogram for all pixels in the image signal and then selects N candidate defect pixels from all pixels according to the luminance histogram and a first threshold. Afterward, the invention sets a window for each candidate defect pixel and then calculates N averaged luminance corresponding to the N windows. Further, the invention judges whether an absolute difference between the luminance of each candidate defect pixel and the corresponding averaged luminance is larger than a second threshold. If it is YES, the candidate defect pixel is recorded as a real defect pixel. Finally, the invention utilizes at least one non-defect pixel around the real defect pixel to correct the real defect pixel. The invention not only compensates the defect pixels accurately and effectively but also reduces required time in correction.

14 Claims, 7 Drawing Sheets

U.S. PATENT DOCUMENTS

| | | | |
|---|---|---|---|
| 2006/0164407 A1* | 7/2006 | Cok | 345/204 |
| 2007/0071304 A1* | 3/2007 | Kuchii et al. | 382/141 |
| 2008/0063268 A1* | 3/2008 | Chiu | 382/167 |
| 2008/0205747 A1* | 8/2008 | Kuchii | 382/149 |
| 2008/0218610 A1* | 9/2008 | Chapman et al. | 348/246 |
| 2009/0129663 A1* | 5/2009 | Chen | 382/149 |
| 2011/0254984 A1* | 10/2011 | Kimura | 348/246 |
| 2011/0293167 A1* | 12/2011 | Hayashi | 382/149 |

* cited by examiner

○ Non-defect pixel   ● Real defect pixel

|  | Type 1 | Type 2 | Type 3 | Type 4 | Type 5 | Type 6 | Type 7 |
|---|---|---|---|---|---|---|---|
| C category | ○<br>○ ● ○<br>○ | ○ ● ○ | ○<br>●<br>○ | ○ ●<br>○ | ○<br>● | ●<br>○ | ● ○ |
| G category | ○   ○<br>  ●<br>○   ○ | ○<br>  ●<br>    ○ | ○<br>●<br>○ | ○<br>  ● | ○<br>● | ●<br>○ | ●<br>  ○ |

FIG. 5

|   |   | C2 |   |   |
|---|---|---|---|---|
|   |   | G2 |   |   |
| C1 | G1 | C0 | G3 | C3 |
|   |   | G4 |   |   |
|   |   | C4 |   |   |

FIG. 6A

| G5 |   |   |   | G6 |
|---|---|---|---|---|
|   | G1 |   | G2 |   |
|   |   | G0 |   |   |
|   | G4 |   | G3 |   |
| G8 |   |   |   | G7 |

METHOD AND CIRCUIT FOR CORRECTING DEFECT PIXELS IN IMAGE SIGNAL

BACKGROUND OF THE INVENTION

1. Field of the Invention

The invention relates to a method and circuit for correcting defect pixels in an image signal.

2. Description of the Prior Art

Recently, with the image sensor resolution increasing to the mega-pixel stage, defect pixels (DP) has become inevitable. And, because of defect pixels, the yield rate of manufacturing mega-pixel image sensors is extremely low. However, if the problem can be recovered by some post image processing technique, the yield rate will be improved apparently.

In prior art, two major methods are adopted for correcting defect pixels. The first method is Static Defect Pixel Correction (SDPC). This method is necessary to calibrate sensors for getting position information about defect pixels before entering the market and record the position information through a suitable non-volatile storage device. Since the sensors have been calibrated and the defect pixel information has been recorded, each of the defect pixels will be corrected during defect pixel correction process.

The second method is Dynamic Defect Pixel Correction (DDPC). This method is unnecessary to calibrate sensors in advance and the non-volatile storage device is not required to record the information about defect pixels. After outputting a pixel of an image frame, the method consults neighbor pixels around the pixel in detecting to judge whether the pixel is a defect pixel or not. Due to different image contents, the non-defect pixel is possible to be misjudged as a defect pixel. In general, the accuracy of the dynamic defect pixel correction is lower than that of the static defect pixel correction.

Most algorithms, such as U.S. Pat. No. 6,965,395 and U.S. Pat. No. 7,199,824, focus on how to find defect pixels accurately and how to compensate the defect pixels correctly with DDPC. However, continuous defect pixels may be a problem when utilizing DDPC. Because of continuous defect pixels, DDPC will be unable to compensate the defect pixels effectively. Because not all neighbor pixels used for compensating the defect pixel are non-defect pixels, the pixels used for correcting may be a defect pixel before the neighbor pixels are judged whether they are defect pixels or not. Therefore, the continuous defect pixels are unable to be corrected and compensated through DDPC.

Figure 1A:
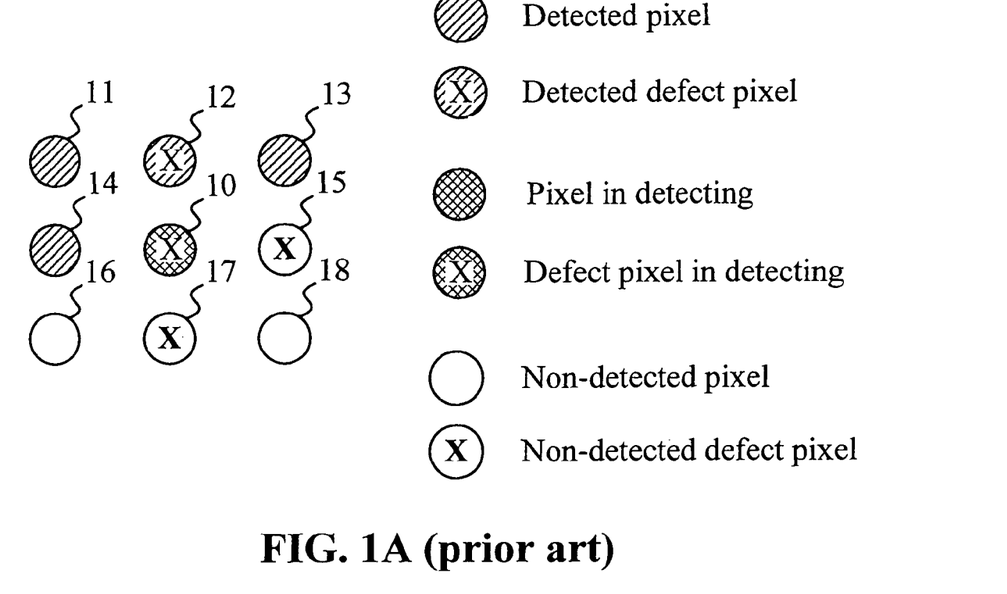
FIG. 1A is a schematic diagram illustrating a dynamic defect pixel correction in prior art.
Figure 1B:
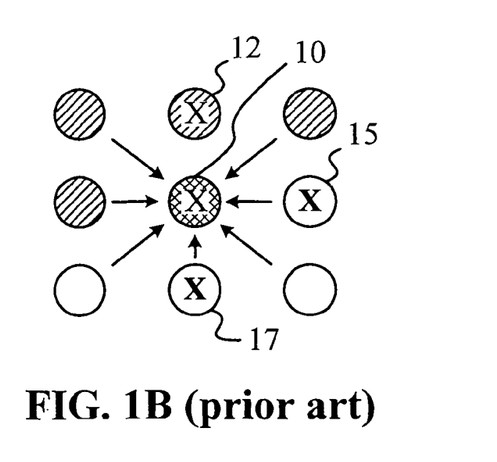
FIG. 1B is a schematic diagram illustrating a dynamic defect pixel correction in prior art.
Figure 1C:
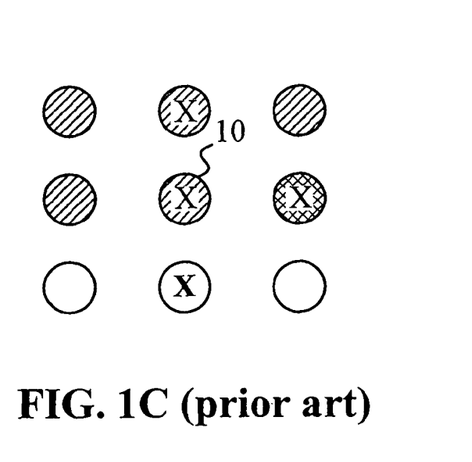
FIG. 1C is a schematic diagram illustrating a dynamic defect pixel correction in prior art.

Please refer to FIG. 1A through FIG. 1C. FIG. 1A through FIG. 1C are schematic diagrams illustrating DDPC of the prior art. As shown in FIG. 1A through FIG. 1C, pixel 10 is being detected and judged as a defect pixel. In order to correct the pixel 10, DDPC utilizes neighbor pixels 11 through 18 to compensate the pixel 10. The neighbor pixel 12 is a detected pixel and a defect pixel, so the pixel 12 will be excluded to compensate the pixel 10. However, the neighbor pixels 15 through 18 are not detected yet, and the neighbor pixels 15 and 17 are defect pixels. Therefore, while compensating the pixel 10, the defect pixels 15 and 17 will be used for compensation on account of unknown. Accordingly, the pixel 10 still can not be corrected accurately after DDPC.

Furthermore, SDPC of the prior art utilizes a recorded list about defect pixel to compensate the defect pixel by simply using an averaged luminance of all neighbor pixels around the defect pixel. Although positions about the defect pixels and the non-defect pixels are known and the defect pixels can be corrected consequently to avoid utilizing defect pixel to correct the defect pixel, the defect pixel still can not be compensated effectively.

Accordingly, the main scope of the invention is to provide a method and circuit for correcting defect pixels in an image signal, so as to solve the aforesaid problems.

SUMMARY OF THE INVENTION

A scope of the invention is to provide a method and circuit for correcting defect pixels in an image signal, so as to compensate defect pixels accurately and effectively and reduce required time in correction.

According to an embodiment of the invention, the invention is to provide a method for correcting defect pixels in an image signal, which comprises a plurality of pixels. First, the invention generates a luminance histogram for all pixels in the image signal and then selects N candidate defect pixels from all pixels according to the luminance histogram and a first threshold. Afterward, the invention sets a window for each candidate defect pixel and then calculates N averaged luminance corresponding to the N windows. Further, the invention judges whether an absolute difference between the luminance of each candidate defect pixel and the corresponding averaged luminance is larger than a second threshold. If it is YES, the candidate defect pixel is recorded as a real defect pixel. Finally, the invention utilizes at least one non-defect pixel around the real defect pixel to correct the real defect pixel.

Furthermore, the invention utilizes a circuit to achieve aforesaid method. The circuit comprises a processing unit, a selecting unit, a calculating unit, a judging unit, a correcting unit. The processing unit is used for generating a luminance histogram for all pixels in the image signal. The selecting unit is used for selecting N candidate defect pixels from all pixels according to the luminance histogram and a first threshold. The calculating unit is used for setting a window for each of the N candidate defect pixels and calculating N averaged luminance corresponding to the N windows. The judging unit is used for judging whether an absolute difference between the luminance of each candidate defect pixel and the corresponding averaged luminance is larger than a second threshold, and the candidate defect pixel is recorded as a real defect pixel if it is yes. The correcting unit is used for utilizing at least one non-defect pixel around the real defect pixel to correct the real defect pixel.

Besides, the invention provides methods for correcting different types of defect pixels. The invention is different from the following prior arts: 1) SDPC utilizes a recorded list about the defect pixel to compensate the defect pixel by simply using an averaged luminance of neighbor pixels around the defect pixel; and 2) DDPC may utilize defect pixels for compensation on account of unknown. The invention not only compensates the defect pixels accurately and effectively but also reduces required time in correction.

The advantage and spirit of the invention may be understood by the following recitations together with the appended drawings.

DETAILED DESCRIPTION OF THE INVENTION

Figure 2:
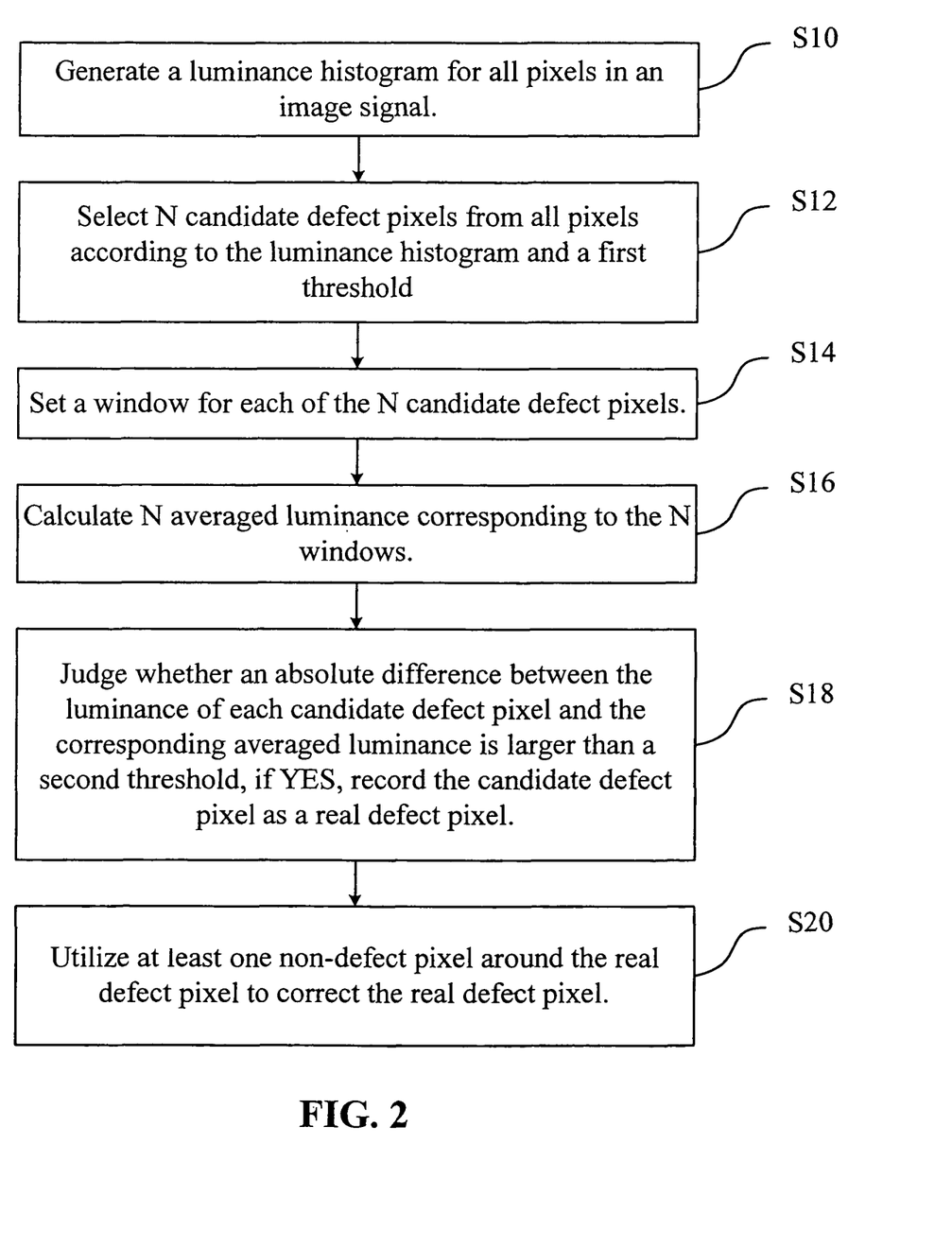
FIG. 2 is a flow chart illustrating a method for correcting defect pixels in an image signal according to an embodiment of the invention.

Please refer to FIG. 2. FIG. 2 is a flow chart illustrating a method for correcting defect pixels in an image signal according to an embodiment of the invention. As shown in FIG. 2, step S10 is performed to generate a luminance histogram for all pixels in the image signal. Step S12 is then performed to select N candidate defect pixels from all pixels according to the luminance histogram and a first threshold, wherein N is a positive integer. Afterward, step S14 is performed to set a window for each of the N candidate defect pixels. Furthermore, in this embodiment, the aforesaid window comprises m*m pixels, and the candidate defect pixel is located at a center of the window, wherein m is a positive integer.

Figure 3:
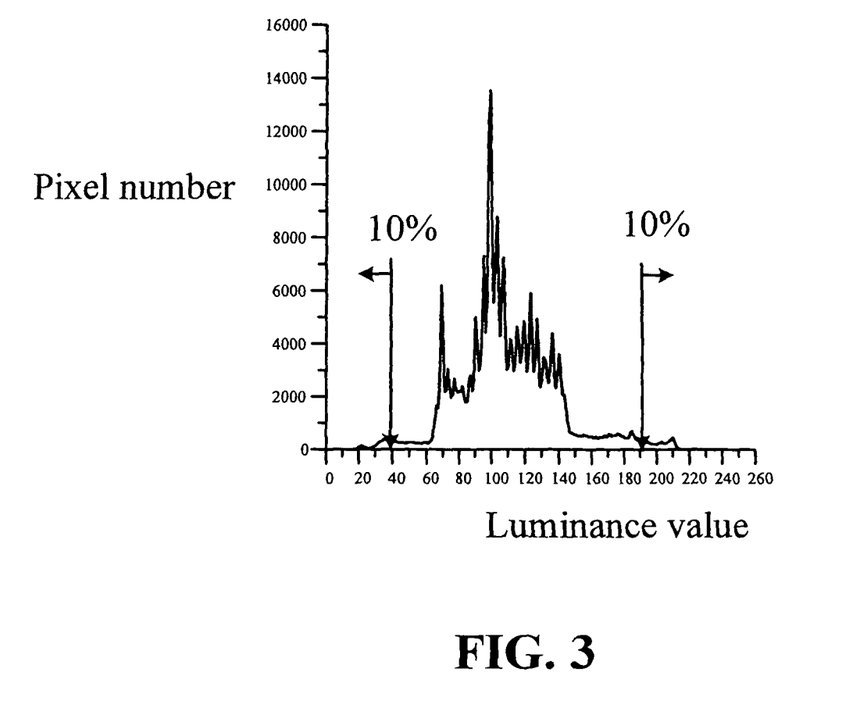
FIG. 3 is a schematic diagram illustrating a luminance histogram.

Please refer to FIG. 3. FIG. 3 is a schematic diagram illustrating a luminance histogram. In step S12, the first threshold comprises an upper limit percentage and a lower limit percentage. The invention sifts candidate defect pixels from all pixels according to the luminance histogram and the first threshold. As shown in FIG. 3, assume that the upper limit percentage of the first threshold is set to upper 10% and the lower limit percentage of the first threshold is set to lower 10%, pixel(s) will be selected as candidate defect pixel(s) if luminance of the pixel(s) is larger than upper 10% or smaller than lower 10% in the luminance histogram. Besides, compared with prior art, required time in correction will be thereby reduced through the first threshold and the luminance histogram. For instance, according to the set first threshold, 85% of required time will be reduced as compared with prior art. It should be noticed that, the required time in correction will be less and less as lowering the first threshold.

After aforesaid steps S10 through S14, step S16 is performed to calculate N averaged luminance corresponding to the N windows. Afterward, step S18 is then performed to judge whether an absolute difference between the luminance of each candidate defect pixel and the corresponding averaged luminance is larger than a second threshold and, if it is YES, record the candidate defect pixel as a real defect pixel. Finally, step S20 is performed to utilize at least one non-defect pixel around the real defect pixel to correct the real defect pixel.

Figure 4:
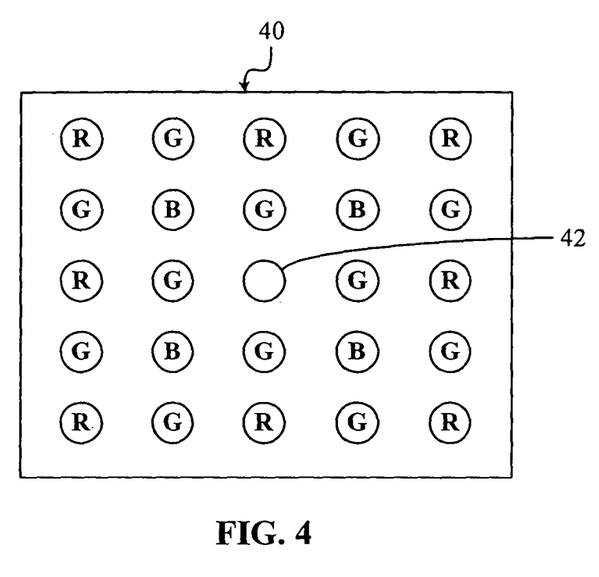
FIG. 4 is a schematic diagram illustrating a window arranged in Bayer pattern.

Please refer to FIG. 4. FIG. 4 is a schematic diagram illustrating a window arranged in Bayer pattern. As shown in FIG. 4, the window 40 comprises 5*5 pixels. Pixel 42 located at the center of the window 40 is one of the aforesaid N candidate defect pixels. Assume that the luminance of the candidate defect pixel 42 is 200 μL, the averaged luminance of 25 pixels within the window 40 is 180 fL, and the second is set to 10 fL. Because the absolute difference between the luminance of the candidate defect pixel 42 and the corresponding averaged luminance (|200 fL−180 fL|=20 fL) is larger than the second threshold, the candidate defect pixel 42 is recorded as a real defect pixel.

Figure 5:
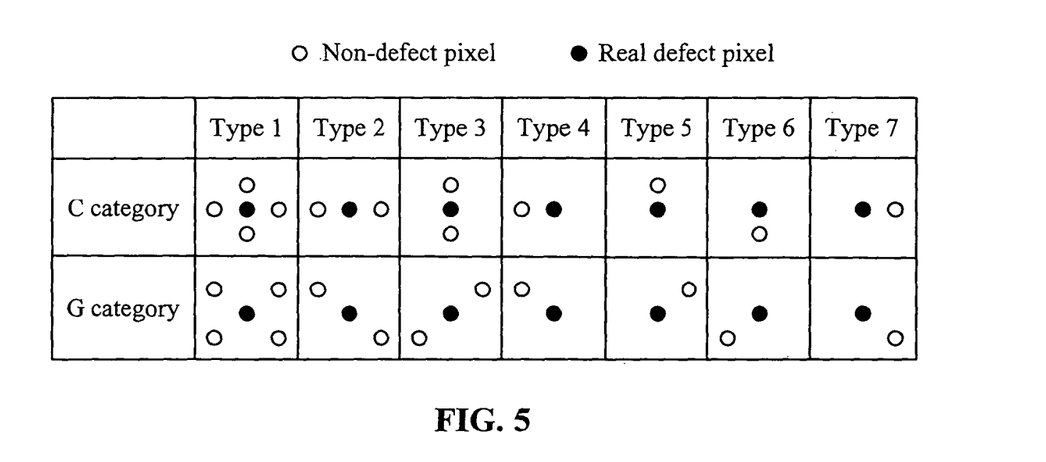
FIG. 5 is a schematic diagram illustrating defect pixel types according to an embodiment of the invention.

Please refer to FIG. 5. FIG. 5 is a schematic diagram illustrating defect pixel types according to an embodiment of the invention. In this embodiment, step S18 can be further performed to define a defect pixel type corresponding to the real defect pixel 42. The Bayer pattern in prior art is consisted of green channel pixel G, red channel pixel R and blue channel pixel B arranged as FIG. 4.

Furthermore, the defect pixels are classified according to pixel category and divided into C category and G category in chief. The C category indicates that the real defect pixel 42 is a red channel pixel R or a blue channel pixel B. The G category indicates that the real defect pixel 42 is a green channel pixel G.

As shown in FIG. 5, the C category and the G category are further classified according to the distribution of the real defect pixel with respect to non-defect pixels and divided into seven types including type 1 through type 7. The type 1 indicates that all pixels with identical channel around the real defect pixel 42 are non-defect pixels. The type 2 and the type 3 defects respectively indicate that pixels with identical channel around the real defect pixel 42 are non-defect pixels only in one direction. And the type 4 through the type 7 indicates that only one pixel with identical channel around the real defect pixel 42 is non-defect pixel. Finally, when all real defect pixels are defined completely, all real defect pixels and corresponding defect pixel types are recorded in a list and stored in a suitable non-volatile storage device.

Besides, when the aforesaid list is completed, step S20 can further look up a type corresponding to a real defect pixel in the list and utilize non-defect pixel(s) around the real defect pixel to correct the real defect pixel. Take the type 4 through the type 7 for example; the only one non-defect pixel can be used for compensating the real defect pixel. If the type is the type 2 or the type 3, an averaged luminance of the two non-defect pixels in identical direction can be used for compensating the real defect pixel.

It should be recognized that when the defect pixel type is type 1, the pixels with identical channel around the real defect pixel are all non-defect pixels. The invention can selectively detect an edge where the real defect pixel is located and utilize non-defect pixels around the real defect pixel and located at or close to the edge to correct the real defect pixel.

Figure 6A:
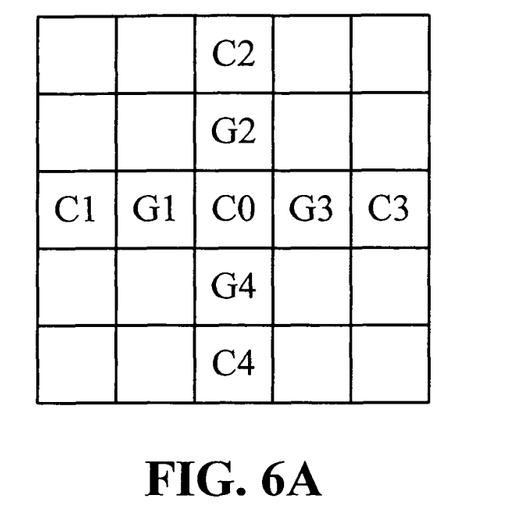
FIG. 6A is a schematic diagram illustrating defect pixel compensation for a defect pixel type which is type 1 of C category.

Please refer to FIG. 6A. FIG. 6A is a schematic diagram illustrating defect pixel compensation for a defect pixel type which is type 1 of C category. As shown in FIG. 6A, if edge detection is more horizontal, an averaged luminance of two non-defect pixels C1 and C3 with identical channel in horizontal direction are utilized to compensate a real defect pixel C0. Similarly, if edge detection is more vertical, an averaged luminance of two non-defect pixels C2 and C4 with identical channel in vertical direction are utilized to compensate a real defect pixel C0.

Figure 6B:
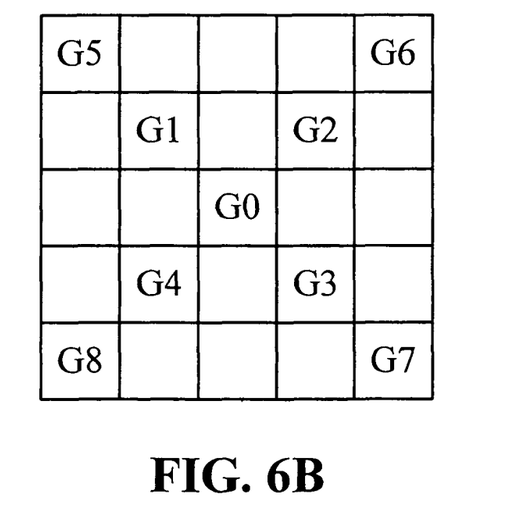
FIG. 6B is a schematic diagram illustrating defect pixel compensation for a defect pixel type which is type 1 of G category.

Please refer to FIG. 6B. FIG. 6B is a schematic diagram illustrating defect pixel compensation for a defect pixel type which is type 1 of G category. As shown in FIG. 6B, if edge detection is more forward diagonal, an averaged luminance of two non-defect pixels G1 and G3 with identical channel in forward diagonal direction are utilized to compensate a real defect pixel G0. Similarly, if edge detection is more backward diagonal, an averaged luminance of two non-defect pixels G2 and G4 with identical channel in backward diagonal direction are utilized to compensate a real defect pixel G0.

Figure 7:
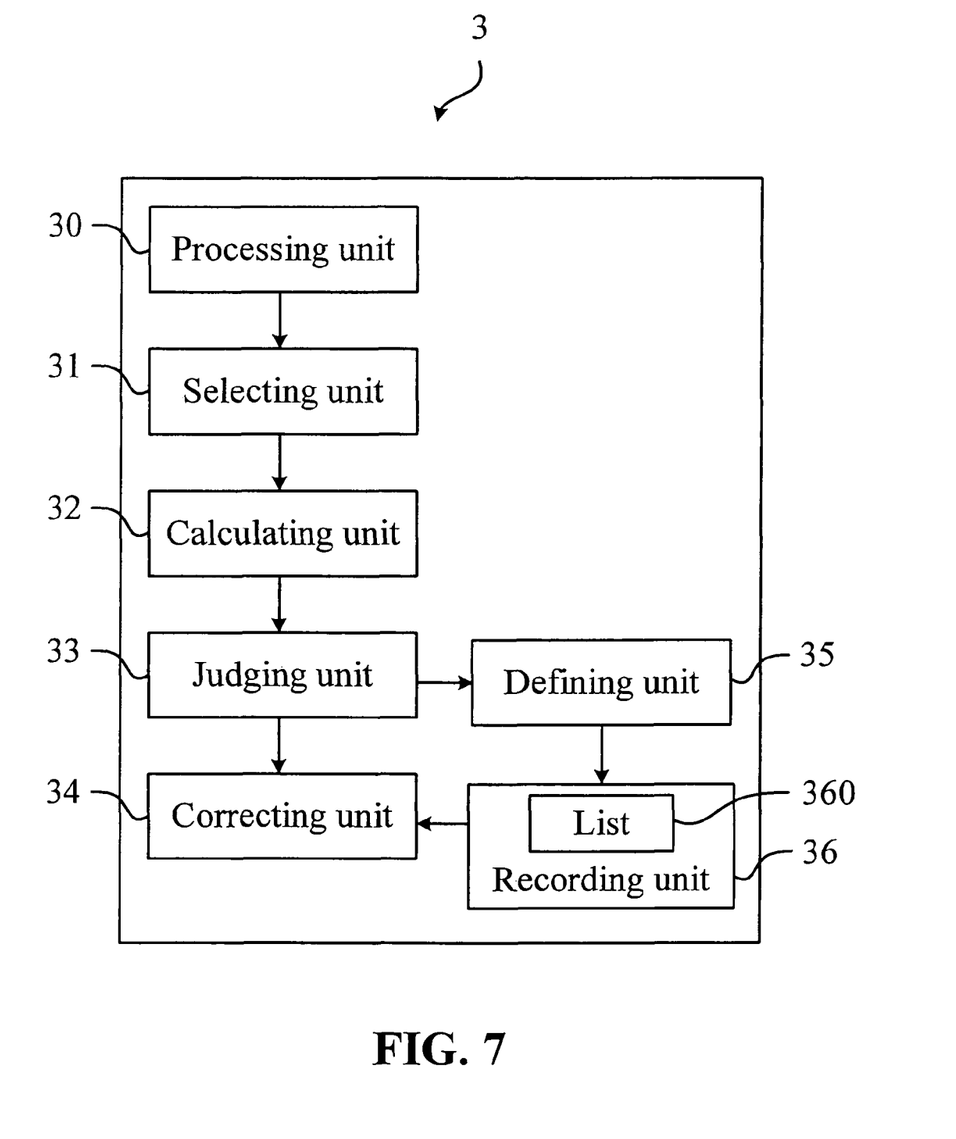
FIG. 7 is a schematic diagram illustrating a circuit for correcting defect pixels in an image signal according to an embodiment of the invention.

Please refer to FIG. 7. FIG. 7 is a schematic diagram illustrating a circuit 3 for correcting defect pixels in an image signal according to an embodiment of the invention. As shown in FIG. 7, a circuit 3 comprises a processing unit 30, a selecting unit 31, a calculating unit 32, a judging unit 33 and a correcting unit 34. The processing unit 30 is used for generating a luminance histogram for the pixels in the image signal. The selecting unit 31 is used for selecting N candidate defect pixels from the pixels according to the luminance histogram and a first threshold. The calculating unit 32 is used for setting a window for each of the N candidate defect pixels and calculating N averaged luminance corresponding to the N windows. The judging unit 33 is used for judging whether an absolute difference between the luminance of each candidate defect pixel and the corresponding averaged luminance is larger than a second threshold, and if YES, the candidate defect pixel is recorded as a real defect pixel. And, the correcting unit 34 is used for utilizing at least one non-defect pixel around the real defect pixel to correct the real defect pixel.

In addition, the circuit 3 can further comprise a defining unit 35 and a recording unit 36. The defining unit 35 is used for defining a type corresponding to the real defect pixel according to a Bayer pattern and an amount of the non-defect pixels around the real defect pixel. The recording unit 36 is used for recording the real defect pixel and the corresponding type in a list 360. Accordingly, the correcting unit 34 can look up the type corresponding to the real defect pixel in the list 360 and utilizes non-defect pixel(s) around the real defect pixel to correct the real defect pixel according to the type.

Figure 8:
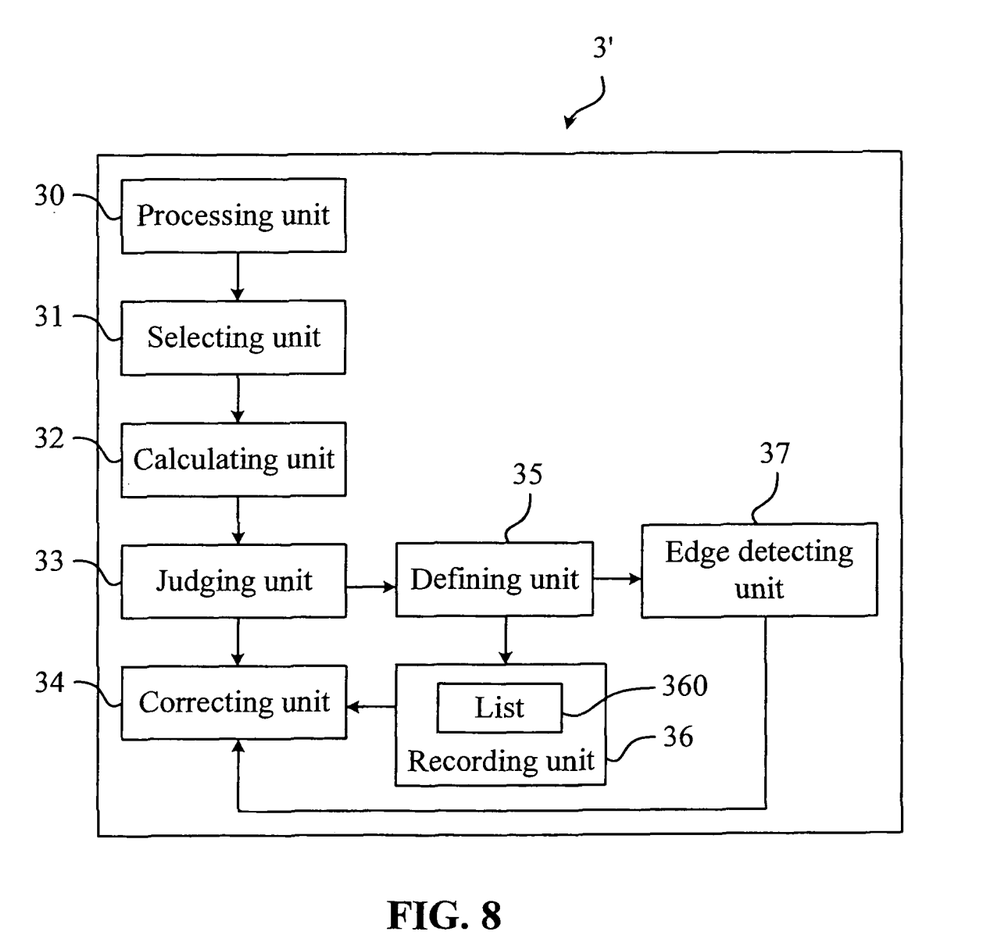
FIG. 8 is a schematic diagram illustrating a circuit for correcting defect pixels in an image signal according to another embodiment of the invention.

Please refer to FIG. 8. FIG. 8 is a schematic diagram illustrating a circuit 3' for correcting defect pixels in an image signal according to another embodiment of the invention. The main difference between the circuit 3' and the circuit 3 is that the circuit 3' can further comprise an edge detecting unit 37. If all pixels around the real defect pixel are non-defect pixels, the edge detecting unit 37 detects an edge where the real defect pixel is located, and the correcting unit 34 utilizes non-defect pixels around the real defect pixel and located at or close to the edge to correct the real defect pixel. The behavior principle of the circuit 3' shown in FIG. 8 is the same as the circuit 3 shown in FIG. 3 and not mentioned again here.

Compared with the prior art, the invention provides methods for correcting different types of defect pixels. The invention is different from the following prior arts: 1) SDPC utilizes a recorded list about the defect pixel to compensate the defect pixel by simply using an averaged luminance of neighbor pixels around the defect pixel; and 2) DDPC may utilize defect pixels for compensation on account of unknown. The invention not only compensates the defect pixels accurately and effectively but also reduces required time in correction.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for correcting defect pixels in an image signal, which comprises a plurality of pixels, comprising steps of:
    (a) generating a luminance histogram for the pixels in the image signal;
    (b) selecting N candidate defect pixels from the pixels according to the luminance histogram, N being a positive integer, wherein the pixel having a luminance belonging to a predetermined luminance range in the luminance histogram is selected to be a defect pixel;
    (c) setting a window for each of the N candidate defect pixels;
    (d) calculating N averaged luminance corresponding to the N windows;
    (e) judging whether an absolute difference between the luminance of each candidate defect pixel and the corresponding averaged luminance is larger than a second threshold, and if YES, recording the candidate defect pixel as a real defect pixel; and
    (f) utilizing at least one non-defect pixel around the real defect pixel to correct the real defect pixel.

2. The method of claim 1, wherein the predetermined luminance range comprises an upper percentage of luminance values of all the pixels and a lower percentage of the luminance values of all the pixels.

3. The method of claim 1, wherein the window comprises m*m pixels, and the candidate defect pixel is located at a center of the window, m is a positive integer.

4. The method of claim 1, wherein step (e) further comprises step of:
    defining a type of the real defect pixel according to Bayer pattern and an amount of non-defect pixels around the real defect pixel.

5. The method of claim 4, wherein the real defect pixel and the corresponding type are recorded in a list.

6. The method of claim 5, wherein step (f) further comprises steps of:
    looking up the type of the real defect pixel in the list; and
    according to the type, utilizing non-defect pixel(s) around the real defect pixel to correct the real defect pixel.

7. The method of claim 1, wherein if all pixels around the real defect pixel are non-defect pixels, step (f) further comprises steps of:
    detecting an edge where the real defect pixel is located; and
    utilizing non-defect pixels around the real defect pixel and located at or close to the edge to correct the real defect pixel.

8. A circuit for correcting defect pixels in an image signal, which comprises a plurality of pixels, comprising:
    a processing unit for generating a luminance histogram for the pixels in the image signal;
    a selecting unit for selecting N candidate defect pixels from the pixels according to the luminance histogram, N being a positive integer, wherein the pixel having a luminance belonging to a predetermined luminance range in the luminance histogram is selected to be a defect pixel;
    a calculating unit for setting a window for each of the N candidate defect pixels and calculating N averaged luminance corresponding to the N windows;
    a judging unit for judging whether an absolute difference between the luminance of each candidate defect pixel and the corresponding averaged luminance is larger than a second threshold, and if YES, recording the candidate defect pixel as a real defect pixel; and
    a correcting unit for utilizing at least one non-defect pixel around the real defect pixel to correct the real defect pixel.

9. The circuit of claim 8, wherein the predetermined luminance range comprises an upper percentage of luminance values of all the pixels and a lower percentage of the luminance values of all the pixels.

10. The circuit of claim 8, wherein the window comprises m*m pixels, and the candidate defect pixel is located at a center of the window, m is a positive integer.

11. The circuit of claim 8, further comprising a defining unit for defining a type of the real defect pixel according to a Bayer pattern and an amount of the non-defect pixels around the real defect pixel.

12. The circuit of claim 11, further comprising a recording unit for recording the real defect pixel and the corresponding type in a list.

13. The circuit of claim 12, wherein the correcting unit looks up the type of the real defect pixel in the list and utilizes non-defect pixel(s) around the real defect pixel to correct the real defect pixel according to the type.

14. The circuit of claim 8, further comprising an edge detecting unit, wherein if all pixels around the real defect pixel are non-defect pixels, the edge detecting unit detects an edge where the real defect pixel is located, and the correcting unit utilizes non-defect pixels around the real defect pixel and located at or close to the edge to correct the real defect pixel.

* * * * *